United States Patent [19]

Titus et al.

[11] Patent Number: 5,794,569
[45] Date of Patent: Aug. 18, 1998

[54] APPARATUS AND METHOD FOR ELECTRONIC CONFINEMENT OF ANIMALS

[75] Inventors: John Titus; Jim Barry, both of Prior Lake; Max Hendrickson, Forest Lake, all of Minn.

[73] Assignee: Joint Techno Concepts International, Inc., Westboro, Mass.

[21] Appl. No.: 741,852

[22] Filed: Oct. 29, 1996

[51] Int. Cl.⁶ ................................................. A01K 29/00
[52] U.S. Cl. ............................................................ 119/721
[58] Field of Search ................................. 119/719, 720, 119/721; 340/573

[56] References Cited

U.S. PATENT DOCUMENTS

| | | |
|---|---|---|
| D. 330,173 | 10/1992 | Juliana et al. |
| D. 330,685 | 11/1992 | Juliana et al. |
| D. 336,055 | 6/1993 | Juliana et al. |
| 3,753,421 | 8/1973 | Peck. |
| 4,150,464 | 4/1979 | Tracy. |
| 4,171,555 | 10/1979 | Bakker et al. |
| 4,669,424 | 6/1987 | Bianco et al. |
| 4,733,633 | 3/1988 | Yarnall, Sr. et al. ................ 119/721 |
| 4,745,882 | 5/1988 | Yarnall, Sr. et al. ................ 119/721 |
| 4,898,120 | 2/1990 | Brose. |
| 4,967,695 | 11/1990 | Giunta. |
| 4,996,945 | 3/1991 | Dix, Jr. |
| 5,053,768 | 10/1991 | Dix, Jr. |
| 5,067,441 | 11/1991 | Weinstein. |
| 5,161,485 | 11/1992 | McDade. |
| 5,207,178 | 5/1993 | McDade et al. |
| 5,207,179 | 5/1993 | Arthur et al. ................ 119/721 |
| 5,349,926 | 9/1994 | McCarney et al. |
| 5,381,129 | 1/1995 | Boardman. |
| 5,425,330 | 6/1995 | Touchton et al. |
| 5,435,271 | 7/1995 | Touchton et al. |
| 5,445,900 | 8/1995 | Miller, Jr. et al. |
| 5,460,124 | 10/1995 | Grimsley et al. ................ 119/721 |
| 5,476,729 | 12/1995 | Miller, Jr. et al. |

*Primary Examiner*—Thomas Price
*Attorney, Agent, or Firm*—Merchant, Gould, Smith, Edell, Welter & Schmidt, P.A.

[57] ABSTRACT

The present invention discloses a method and apparatus for electronically confining an animal within one or more selected spaces within a selected area. Current pulses are directed around conducting perimeters surrounding the selected spaces. The animal to be confined is provided with a collar unit, which includes a sensor adapted to sense whether the animal approaches a conducting perimeter from inside the selected space or outside the selected space, and a correction unit adapted to provide correction to the animal in response to a sensor output. The portable unit reports to a central controller which selects a correction strategy, such as level of correction to be applied to the animal approaching the perimeter. The controller provides warnings to the user, including warnings for when the animal passes out of bounds, when the battery in the collar unit goes low and when the animal stays in a correction zone for too long. An additional feature of the invention includes the ability to connect a computer to the system for remote control and monitoring, and for maintaining a log of animal behavior.

49 Claims, 9 Drawing Sheets

APPARATUS AND METHOD FOR ELECTRONIC CONFINEMENT OF ANIMALS

BACKGROUND OF THE INVENTION

1. Field of the Invention

This invention relates in general to a method and apparatus for containing an animal, and in particular to an electronic method and apparatus for containing an animal relative to a selected boundary.

2. Description of Related Art

Electronic animal control systems commonly include an electronic collar unit attached to the animal. When the animal approaches a wire laid around the perimeter of a back yard, the collar unit detects a magnetic field produced by the wire and then produces a correction to modify the animal's behavior. The correction typically takes the form of an acoustic signal or an electric shock.

Present electronic animal control systems are relatively unsophisticated devices. For example, the collar unit does not distinguish what side of the wire the animal is on. Thus, the collar unit always applies corrections to the animal as it approaches the wire, even if the animal has previously escaped and is now attempting to re-enter the yard from outside the perimeter. Consequently, the animal is punished for good behavior. In addition, the user is not notified when the animal escapes from the yard, nor is there any record kept of animal activity relative to the perimeter.

The collar unit is generally an autonomous unit which is battery powered. The lifetime of the battery is affected by many factors, including the number of corrections which are provided to the animal. The user is not provided with information regarding the number of corrections the animal receives, nor with the current state of the battery. Thus, the user may be unaware that the battery has lost charge, and the user has to guess when a new battery is needed in the collar unit.

There is therefore a need for an electronic animal control system which does not correct an animal trying to re-enter a containment area. There is also a need for a more sophisticated system which is able to warn the user when an animal passes out of bounds and when the battery in the collar unit is low. There is a general need for a more sophisticated approach to electronic animal control systems which can provide the user with many advanced features not yet available with current systems. Finally, there is a need for an animal control system which provides for the management of a plurality of containment spaces within a containment area.

SUMMARY OF THE INVENTION

To overcome the limitations in the prior art described above, and to overcome other limitations that will become apparent upon reading and understanding the present specification, the present invention is method and apparatus for electronically confining an animal within a selected area surrounded by a conducting perimeter. The method is directed to sensing whether the animal approaches the perimeter from inside the selected area or from outside the selected area, and selectively correcting the animal in response to results of the sensing step.

A first embodiment of the apparatus employed to restrict movement of an animal relative to a perimeter surrounding a selected area, includes a portable unit on the animal comprising a sensor that senses whether the animal approaches the conducting perimeter from inside the selected area or outside the selected area. When the apparatus senses the animal's approach to the perimeter from within the selected area, the portable unit provides the appropriate acoustic or electrical correction. No correction is applied to the animal when the apparatus senses that the animal is re-entering the selected area from outside the perimeter.

A second embodiment of the apparatus includes a conducting perimeter, a portable unit provided on the animal and in radio contact with a central controller. When the portable unit detects the animal's approach to the perimeter, the portable unit transmits this information to the central controller, with a request for instruction. The central controller is programmed to provide an appropriate command to the portable unit, preferably by an encoded magnetic signal transmitted on the conducting perimeter.

The use of a central controller advantageously allows data storage and decision making functions to be in a central location, thus allowing these functions to be easily programmable, and permitting the portable units to be simpler and smaller than those currently available. The central controller's choice of correction to be applied to the animal depends on a number of factors, including the distance to the perimeter as estimated by the portable unit. The central controller permits the user to program a variety of control parameters, including the level of acoustic signal and electric shock as a function of distance from the perimeter, and whether to continue applying correction to the animal while it is out of bounds. The central controller advantageously permits the control of a number of portable units simultaneously, thus allowing the control of several animals within the perimeter. The correction instructions transmitted to each portable unit may be different, permitting unique correction strategies to be programmed for each animal. The central controller advantageously permits the control of a plurality of separate conducting perimeters, allowing the management of a plurality of containment spaces.

The system may provide warnings to the user when a particular animal passes out of bounds, the battery goes low, or if the animal does not move away from the perimeter. An additional feature of the invention includes the ability to connect a computer to the system for providing remote monitoring and control, and for maintaining a log of animal behavior.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENT

In the following description of the illustrated embodiment, reference is made to the accompanying drawings which form a part hereof, and in which is shown by way of illustration various embodiments in which the invention may be practiced. It is to be understood that other embodiments may be utilized and structural changes may be made without departing from the scope of the present invention.

The present invention is directed to an apparatus for restricting the movement of an animal within a selected area. Typically, the animal may be a pet, and the selected area may be a portion, or all, of a front or back yard. The selected area may include one or a plurality of selected spaces. The invention allows the animal to roam free within the selected area and warns the animal when approaching the perimeter of the selected area. The warning typically includes a correction, preferably in the form of an audible signal or an electric shock, in order to dissuade the animal from escaping from the selected area. The selected area may include one or more selected spaces Referring now to FIG. 1 which shows an animal control apparatus 19, selected spaces 20 and 21 are surrounded by buried wires 22 and 23 respectively, each buried wire 22 and 23 typically located a few inches below the surface. The perimeters of the selected spaces may be defined in some other way, for instance the wire may not be buried, or the electrical conductor may not be in the form of a wire. The buried wires 22 and 23 are respectively powered by power units 24 and 25. The power units 24 and 25 are controlled by a controller 26 which is preferably connected to a computer 28 for maintaining an activity log. The following description refers to buried wire 22 and power supply 24, but may be applied equally to buried wire 23 and power supply 25. The animal 30 contained within the selected space 20 is provided with a portable unit 32. The portable unit 32 is preferably in the form of a collar placed around the animal's neck, but may also be a belt around the animal's abdomen or leg, or attached to the animal in a similar way.

Figure 1:
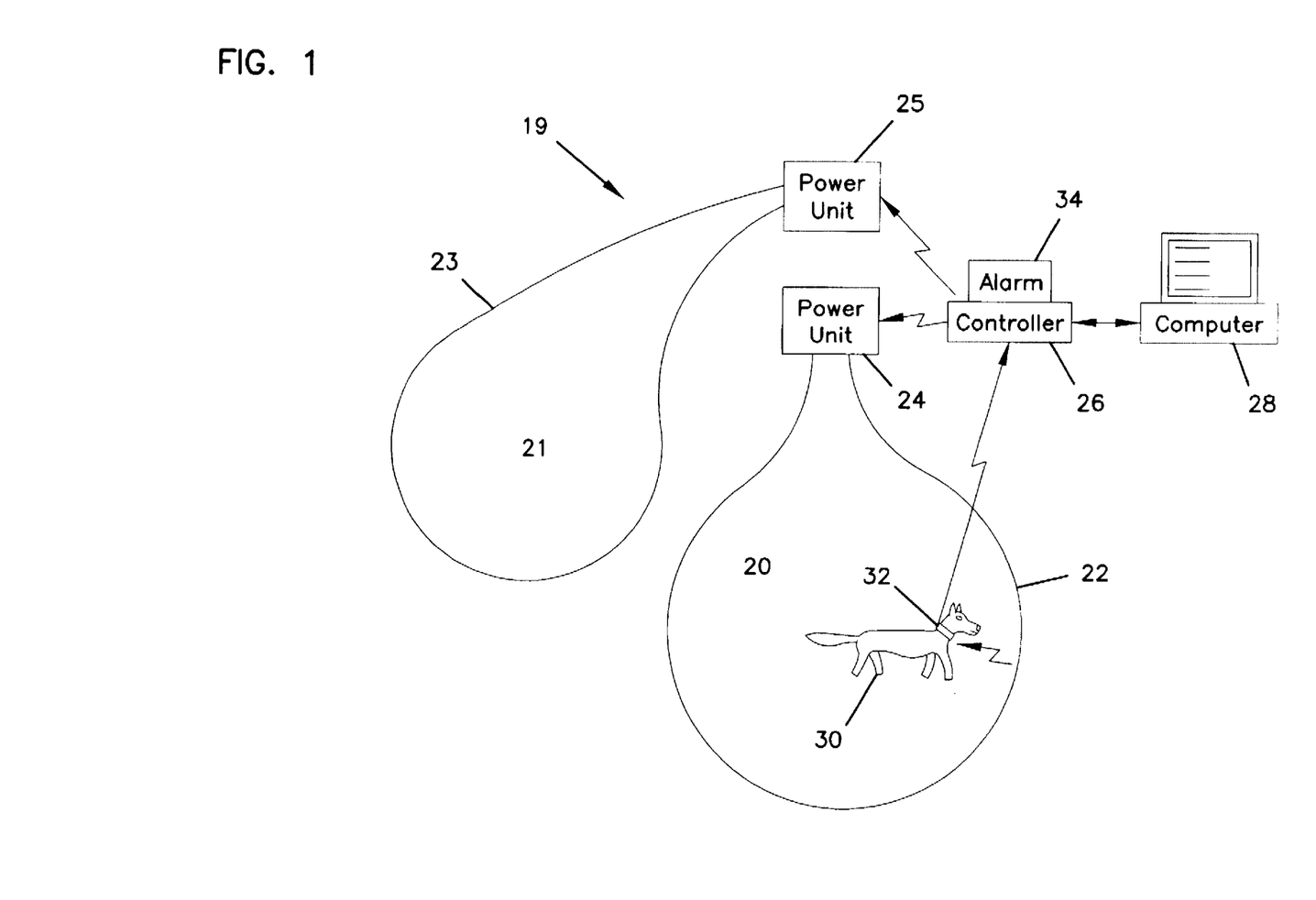
FIG. 1 illustrates the apparatus for electronic confinement of animals according to the present invention.

The power unit 24 typically transmits a series of electrical pulses around the buried wire 22, so as to produce a modulated magnetic field in an area close to the buried wire 22. The portable unit 32 includes a magnetic sensor to detect the magnetic field produced by the buried wire 22, and is typically sufficiently sensitive to provide a positive detection of the magnetic field at a distance ranging between approximately six to twelve feet from the buried wire 22. The portable unit 32 includes a radio transmitter which transmits a signal to the controller 26 indicating that a magnetic field has been detected. If the portable unit 32 or controller 26 determines that the animal 30 has crossed the buried wire 22 so as to escape from the selected space 20, then the controller 26 may activate an alarm 34 which indicates to the owner or guardian of the animal 30 that the animal 30 has left the selected space 20.

The portable unit 32 is provided with a magnetic field sensor which senses the strength and direction of the magnetic field. The strength of the magnetic field is determined by the distance from the buried wire 22 to the portable unit 32. The direction of the magnetic field is determined by whether the animal 30 is approaching the buried wire 22 from within or outside the selected space 20. An important aspect of the present invention is that if an animal 30 has escaped from the selected space 20, then the portable unit 32 is operable so as not to provide correction to the animal 30 if the animal subsequently attempts to re-enter the selected space 20 by crossing the buried wire 22 from the outside.

Figure 2:
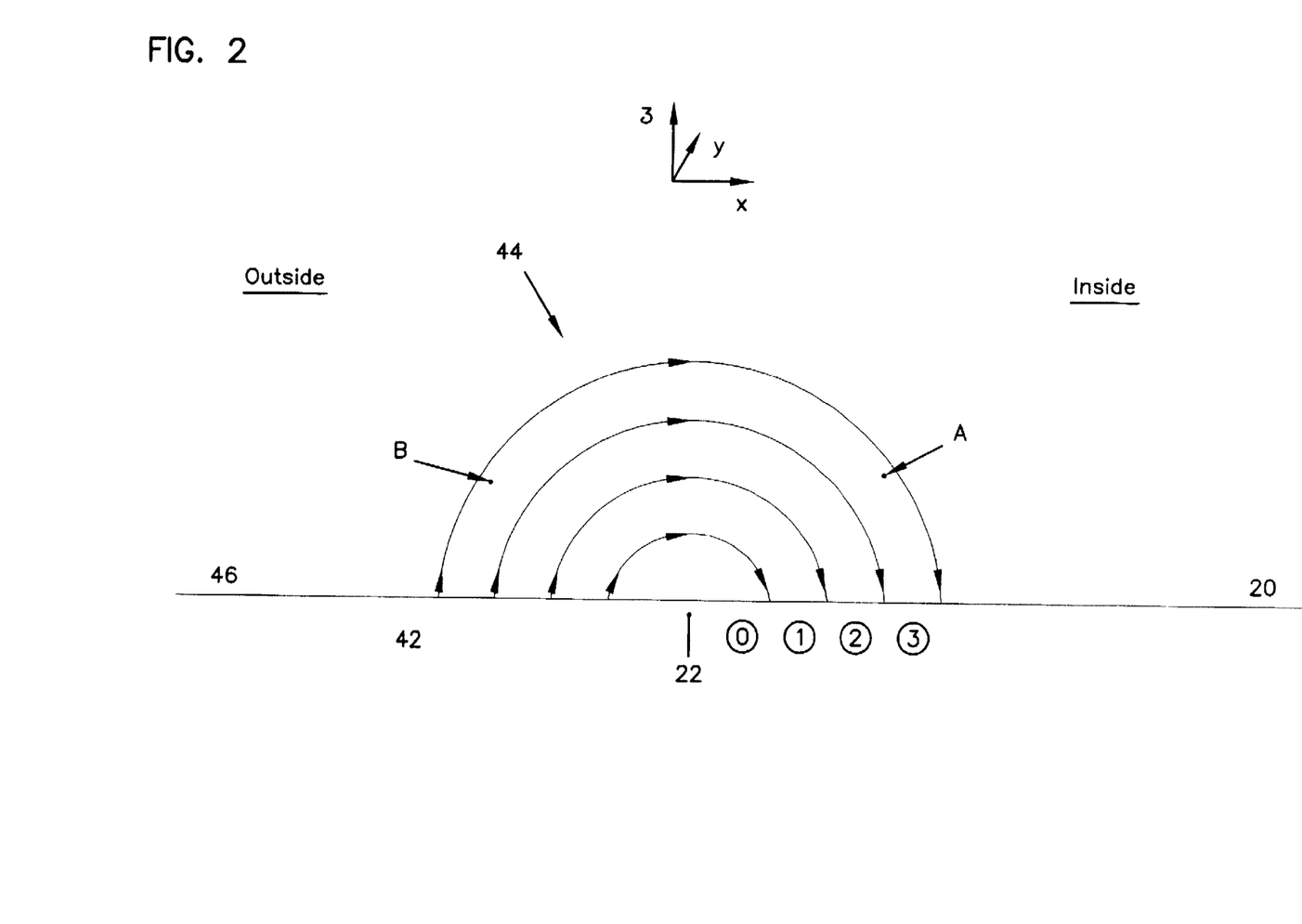
FIG. 2 illustrates the magnetic field around the buried wire of the electronic confinement apparatus.

FIG. 2 shows a cross-section through a section of ground 42, in which the buried wire 22 is buried. The current flowing through the buried wire 22 is assumed to be flowing into the direction of the figure, in the y-direction. The magnetic field 44 resulting from the current flowing through the buried wire 22 is circular, as shown. The area to the right of the buried wire 22 is inside the selected space 20 and the area to the left is the outside area 46.

The direction of the magnetic field 44 may be detected and used to determine whether the animal wearing the correction unit 32 is approaching the buried wire 22 from either inside the selected space 20 or outside the selected space 46. For example, at position A, the magnetic field 44 has a non-zero vertical component, parallel to the y-axis. By establishing that the magnetic field 44 has a downwardly directed component, it is possible to determine that the portable unit 32 is within the selected space 20. On the other hand, at location B, the magnetic field 44 has a non-zero vertical (y-axis) component which is directed upwards. By establishing that the magnetic field 44 has an upwardly directed component, the portable unit 32 may establish that the animal is outside the buried wire 22. Thus, by providing a portable unit 32 which is able to establish a direction of the magnetic field 44, the animal control apparatus 19 may determine whether the animal 30 is inside or outside the selected space 20. The animal control apparatus 19 may then determine a course of correction for the animal 30 depending on the position of the animal 30 relative to the buried wire 22.

Generally, it is advantageous to provide correction to the animal 30 as it approaches the buried wire 22 from inside the selected space 20. Conversely, it is not desirable to provide correction to an animal 30 which is re-entering the selected space 20. Rather, it is advantageous to avoid correcting the animal if it tries to re-enter the selected space 20 and, therefore, not punish the animal for engaging in good behavior.

Regions of increasing distance from the buried wire 22 are illustrated as zones 0, 1, 2, and 3. The portable unit 32 detects not only the direction of the magnetic field 44, but also its strength. As the animal moves closer to the buried wire 22, the portable unit 32 determines that the animal is moving from zone to zone towards the buried wire 22.

Figure 3:
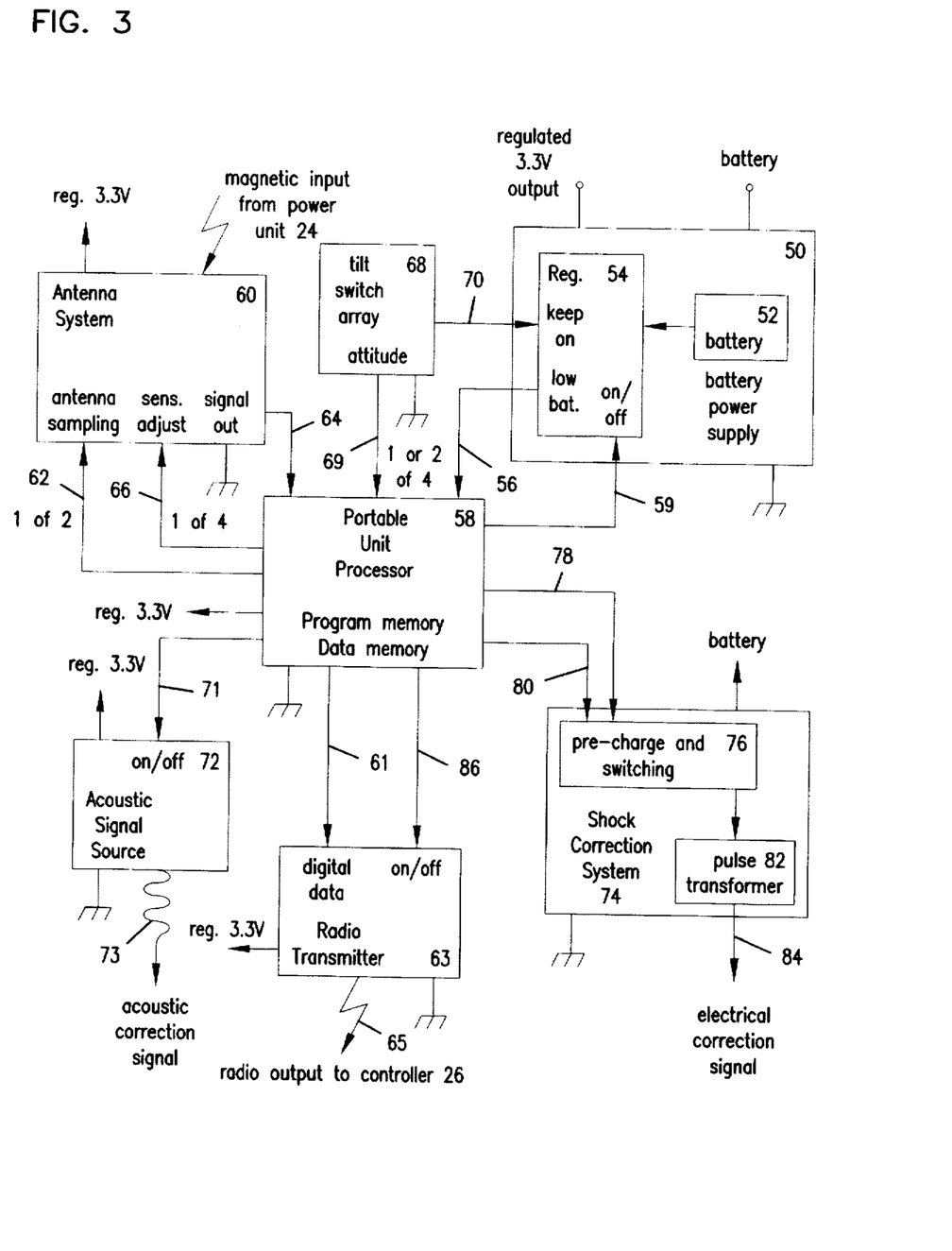
FIG. 3 illustrates a block diagram schematic of the portable unit of the electronic confinement apparatus.

In FIG. 3 is illustrated a block diagram of the portable unit 32. Power is applied to the portable unit 32 by the battery power supply 50. The battery power supply 50 includes a battery 52, preferably of the long life, lithium, coin-shaped type. A battery 52 of this preferred type advantageously reduces the profile of the portable unit 32 and the period between battery changes. The voltage output from the battery 52 is regulated by a regulator 54, such as one from the MICREL 2570 series of regulator chips, so as to give a regulated output of 3.3 Volts. The regulator 54 ensures that the output from the battery power supply 50 is maintained at 3.3 Volts, even when the voltage derived from the battery 52 is less than 3.3 Volts. The regulator 54 detects when the voltage of the battery 50 has fallen below a pre-selected acceptable level, typically around 0.7 Volts. When the low battery voltage condition is detected, the regulator 54 directs a low battery voltage signal 56 to a portable unit processor 58. On receiving the low battery voltage signal 56, the portable unit processor 58 transmits a low battery voltage message over the data line 61 to the radio transmitter 63. The radio transmitter 63 then transmits a low battery voltage message to the controller 26 to alert the user of the low battery voltage condition of the portable unit 32.

The antenna system 60 preferably includes two orthogonal antennas, for detecting the magnetic field 44 produced by the current running through the buried wire 22. The portable unit processor 58 directs an antenna sampling signal 62 to sample the signals received from each antenna. If more than two antennas are used, the sampling signal selects one antenna from all the antennas present. The portable unit processor 58 may also adjust the sensitivity of the antenna system through the sensitivity adjust signal 66, as is described hereinbelow. An important aspect of the invention is that the controller 26 may select an appropriate form of correction given to the animal 30 in response to the distance between the animal 30 and the buried wire 22. A tilt switch array 68, preferably of the ball bearing type, is provided on the portable unit 32. The tilt switch array 68 serves several functions, including the determination of activity of the animal 30. Since the tilt switches are sensitive to movement, the movement of the animal 30 acts to repeatedly switch the tilt switches in the tilt switch array 68 on and off. An activity signal 70 from the tilt switch is fed to the regulator 54 in the battery power supply 50. The regulator 54 preferably includes a timer circuit which powers down the regulated 3-Volt output unless activity is detected by the tilt switch array 68 within a preselected timeout period, typically ranging from 30 to 120 seconds.

The tilt switch array 68 also provides orientation information to the portable unit processor 58 through the attitude signal 69. Orientation information is important in determining the direction of the magnetic field 44 detected and is discussed further in connection with the antenna system 60 hereinbelow.

When the portable unit 32 has detected that the animal 30 is approaching the buried wire 22, a signal is transmitted from the portable unit 32 to the controller 26 by the radio transmitter. The transmitted signal indicates the distance the animal 30 is from the buried wire 22. The controller 26 then determines what kind of correction should be applied to the animal 30, for example an acoustic signal, low-level electric shock, or a high-level electric shock. Once the controller 26 has selected the applicable correction, the controller 26 then directs the power unit 24 to generate coded electrical pulses which are received by the antenna system 60. The coded pulses include instructions for correcting the animal 30. For example, if the instructions received from the controller 26 indicate that the animal 30 should be corrected by an acoustic alarm, then an alarm signal 70 is directed to an acoustic signal device 72. The acoustic signal device 72 may be an intermittent buzzer, operating at audible frequencies, or at ultra-sonic frequencies detectable by the animal 30. If the instructions received from the controller 26 indicate that the animal should be corrected by the application of an electric shock, then the portable unit processor 58 activates the shock correction system 74. The shock correction system 74 generates an electrical shock signal 84 which is typically applied to the animal by a pair of contact electrodes. Preferably, the shock correction system 74 includes a capacitive precharge circuit 76 which is charged by a precharged signal 78. After a predetermined charging time, the portable unit processor 58 directs a discharge signal 80 to the capacitive precharge circuit 76. The capacitively stored energy is preferably discharged through a pulse transformer 82 to generate an electrical shock signal 84 which is applied to the animal 30. The voltage generated by the capacitive precharge circuit 76 is generally around 30 Volts, and the pulse transformer typically increases the voltage of the electrical shock signal 84 to approximately 1,000 Volts. The predetermined duration of the charging cycle determines the amount of charge capacitively stored in the capacitive precharge circuit 76. The intensity of the electrical shock signal 84 applied to the animal 30 may be varied by selected variation of the duration of the precharge cycle according to instructions received from the controller 26.

Another important feature of the present invention is that the controller 26 determines the level of correction to be applied to the animal 30 in response to the separation between the animal 30 and the buried wire 22. As the animal 30 moves closer to the buried wire 22, the level of correction may be increased. For example, the first level of correction applied to the animal in zone 3 may be a soft acoustic alarm generated by the acoustic signal device 72. As the animal moves closer to the buried wire 22, in zone 2, the acoustic alarm may increase in volume, intensity, or duration of alarm signal, indicating to the animal 30 that the behavior of moving towards the buried wire 22 is not acceptable. If the animal 30 persists in approaching the buried wire 22, then a low-level electrical shock may be applied by the shock correction system 74, zone 1. The electrical shock signal 84 is advantageously increased with intensity when the animal approaches closer to the buried wire 22. Alternative correction strategies may be followed by the controller 26, such as applying only acoustic correction to the animal 30, irrespective of how close the animal 30 approaches the buried wire. Additionally, if the animal 30 approaches within a certain distance of the buried wire 22 so as only to initiate an acoustic alarm, but does not retreat from the buried wire 22 within an acceptable time, then the controller 26 may direct the portable unit 32 to apply an increased level of correction, such as a low-level electrical shock.

The portable unit processor 58 may be programmed to provide electrical shocks to the animal 30 at regular intervals if it escapes past the conducting perimeter. These regular electrical shocks are preferably programmed to continue until the animal re-approaches the buried wire 22.

The portable unit processor 58 is preferably adapted to control the battery power supply 50 so as to reduce the possibility of RF interference from the regulator 54 interfering with the magnetic signals detected by the two orthogonal antennas in the antenna system 60. The portable unit processor 58 turns the regulator 54 off by the regulator control signal 59 so as to reduce RF interference. Turning off the regulator 54 results in a loss of regulated voltage applied to the other elements of the portable unit 32. By maintaining input capacitors on the power supply line for each circuit supplied by the battery power supply in the portable unit 32, the regulator 54 may preferably be turned off for up to around 10 seconds at a time. After a 10-second off interval, the regulator 54 is reactivated by the regulator control line 59 and a 3-Volt regulated signal re-applied to each of the elements in the portable unit 32, so as to recharge the input capacitors.

Figure 4:
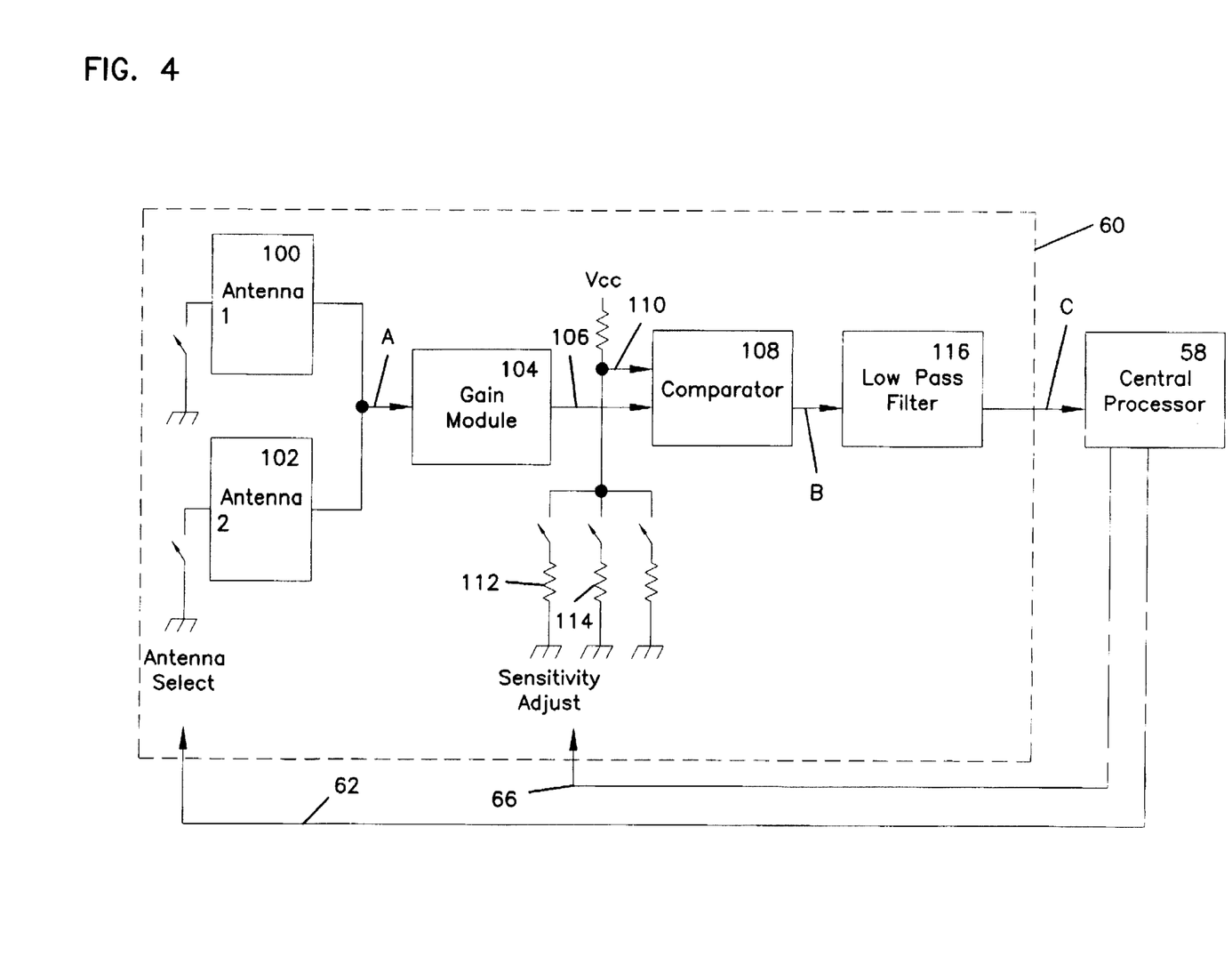
FIG. 4 illustrates a block diagram schematic of the antenna system in the portable unit.

FIG. 4 illustrates a block schematic diagram of the antenna system 60. Antenna one 100 and antenna two 102 are oriented so that their respective directions of maximum sensitivity are orthogonal. The antennas 100 and 102 are preferably oriented on the animal 30 so that the plane defined by the directions of maximum sensitivity for each antenna is a vertical plane extending forward from the animal 30. For example, if the animal 30 is a dog, then the plane defined by antenna one 100 and antenna two 102 is a vertical plane parallel to the dog's spine, and dividing the dog into right and left halves. Each antenna 100 and 102 has associated with it one or more tilt switches in the tilt switch array 68. These associated tilt switches indicate the orientation of the antenna, so that the portable unit processor 58 may determine the attitude of each antenna 100 and 102 and subsequently determine which side of the buried wire the animal 30 is on, as described hereinbelow.

The output A from both antennas 100 and 102 is directed to a gain module 104, which is typically an operational amplifier operating in the linear region. The output 106 from the gain module 104 is directed to a comparator 108 which compares the gain module output 106 with a reference signal voltage 110. The reference signal voltage 110 is set by the sensitivity adjust signal 66 from the portable unit processor 58 in the portable unit 32. The sensitivity adjust signal 66 selects programmable resistors 112 and 114 in the voltage divider so as to vary the reference signal voltage 110. The use of two programmable resistors 112 and 114 results in four different possible voltage values being applied as the reference voltage 110, corresponding to the four zones around the buried wire 22. The highest reference signal voltage 110 corresponds to zone 0, closest to the buried wire 22, while the lowest reference signal voltage 110 corresponds to zone 3, the zone furthest from the buried wire 22. When there is no output from the comparator 108 at a given reference signal voltage 110, the animal 30 is assumed to be outside the corresponding zone. The portable unit processor 58 may be programmed to ignore signals generated when the animal 30 is indicated to be in zone 0, since the vertical component of the magnetic field 44 in zone 0 may be small compared to the horizontal component.

The output from the comparator 108 is directed to a low pass filter 116. The output from the low pass filter 116 is directed to the portable unit processor 58 as the data out signal 64. The portable unit processor 58 samples the signal from one antenna at a time using the antenna sampling signal 62.

Once the portable unit processor 58 has processed the data out signal 64 from the antenna system 60, the processed data, including an out of bounds signal, is transferred to the radio transmitter 61 for transmission to the controller 26. The information packet transmitted by the radio transmitter typically includes a code identifying the portable unit, data indicating which zone the portable unit 32 is in and the out of bounds signal.

The comparator 108 may be included in the portable unit processor 58, in which case the signal 106 from the gain module 104 may be transmitted through the low pass filter 116 before entering the comparator 108.

Figure 5:
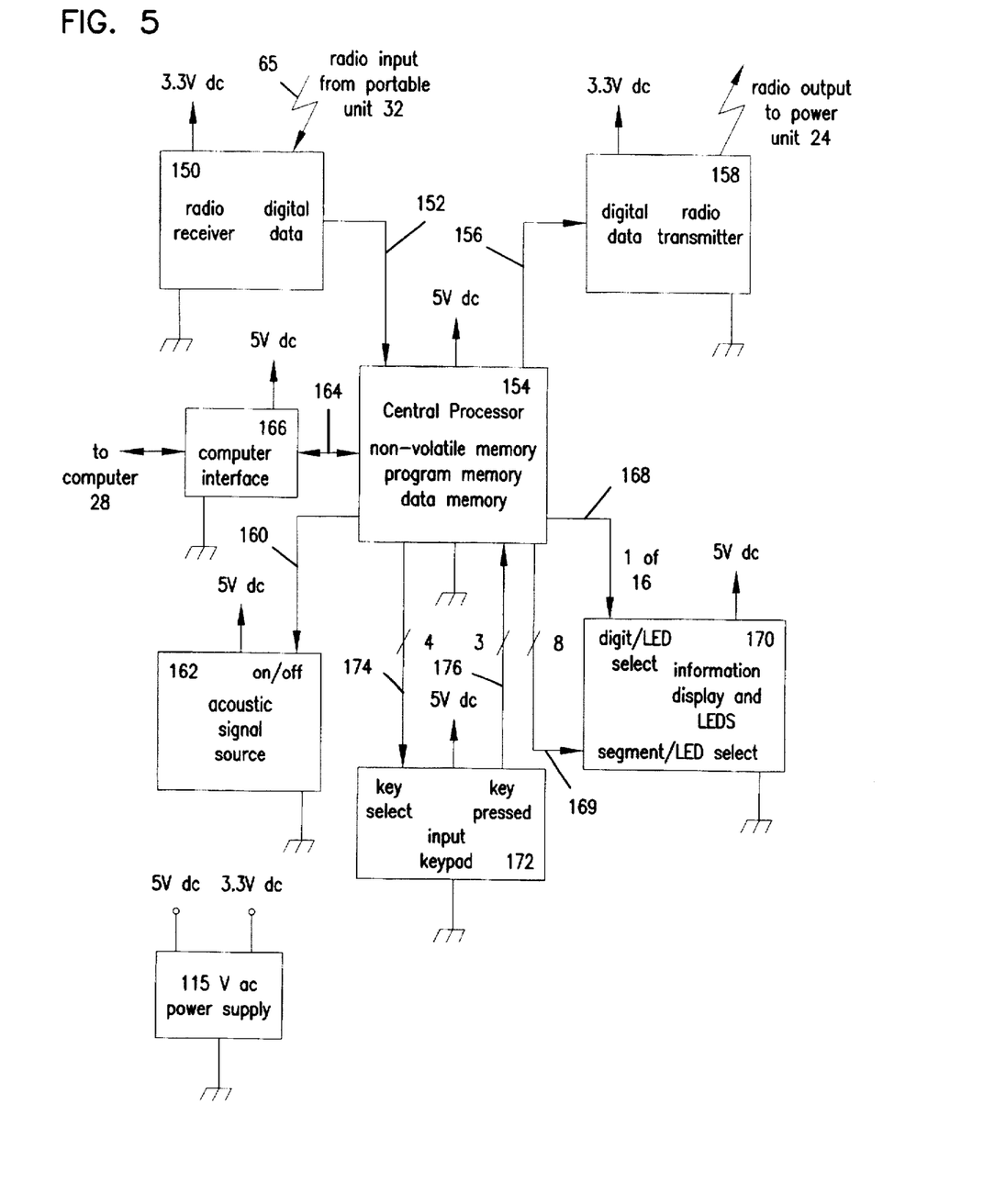
FIG. 5 illustrates a block diagram schematic of the controller unit of the electronic confinement apparatus.

A block diagram schematic of the controller 26 is illustrated in FIG. 5. The radio signals 65 transmitted by the radio transmitter 63 in the portable unit 32 are received by the radio receiver 150 in the controller 26. The radio signals are decoded and the data transmitted from the portable unit 32 is transferred via the data input line 152 to the central processor 154.

The central processor 154 includes non-volatile memory, program memory, and data memory, and controls operating functions of the animal control apparatus 19.

When the portable unit 32 determines that the animal 30 has entered one of the zones around the buried wire, the portable unit 32 transmits the number of the zone where the animal 30 is located and an identification code to the controller 26. The central processor 154 in the controller 26 includes program memory so that the user may program the animal control apparatus 19 to provide different levels of correction according to the zone the animal 30 is in. When the central processor 154 receives the zone information from the portable unit 32, the central processor 154 transmits a correction instruction appropriate to the zone currently occupied by the animal 30. The correction instruction is directed to the radio transmitter 158 via the data output line 156. The radio transmitter 158 transmits the instructions to the power unit 24 which then encodes correction commands on the current signals in the buried wire 22, as discussed hereinbelow. After the portable unit 32 receives and decodes these correction commands, the appropriate correction is applied to the animal. The controller 26 may control the operation of a plurality of power units 24 and 25, allowing control animals in a plurality of selected spaces 20 and 21.

When the portable unit 32 transmits an out-of-bounds signal to the controller 26, the central processor 154 may be programmed to take one of a number of different actions. For example, the central processor 154 may transmit an alarm signal 160 to activate an acoustic signal source 162 so that the operator is informed of the animal's excursion out of bounds. Alternatively, the central processor 154 may direct a computer signal 164 to a computer interface 166, such as an RS232 interface, connected to the computer 28. The computer 28 may be programmed to transmit a message on telephone line indicating that the animal 30 has passed out of bounds. In addition, the central processor 154 may also transmit an activation signal along the LED select line 168 to illuminate an LED on the information display 170.

If the radio transmitter 63 of the portable unit 32 transmits a low battery voltage signal to the controller 26, the central processor 154 may warn the user of the low battery condition by directing a low battery voltage signal to the information display 170 through one of the LED select lines 168.

The central processor 154 monitors the distance between the animal 30 and the buried wire 22 while the animal approaches the buried wire 22. The central processor 154 may be programmed to increase the level of correction to the animal if it does not respond to correction in a timely manner, for example within around 3–5 seconds. Increasing the level of correction includes increasing the intensity of the acoustic signal, changing from an acoustic signal to an electrical shock signal, and increasing the intensity of the electrical shock signal. Additionally, the central processor 154 may measure the time for the animal 30 to move from one zone to the next and, it it determines that the animal is approaching the buried wire above a preselected speed, the central processor 154 may apply a level of correction higher than would be applied if the animal 30 were approaching the buried wire 22 at a lower speed.

The central processor 154 may be programmed to cease the application of correction if the animal 30 does not respond to the increased level of correction within a certain time, for example approximately 10 seconds, since the animal 30 may be caught in the zone and be unable to move away from the buried wire 22. Following a rest period of approximately 10 seconds, correction may be reapplied for another approximately 10 second period. If the animal 30 still does not respond move out of the correction zone, then correction ceases and the central processor 154 may then warn the user that the animal has become caught close to the buried wire 22. The user may be warned through a combination of the acoustical signal source 162, the information display 170, and the computer interface 166.

The controller 26 may be used to create an historical Log of the encounters of the animal 30 with the buried wire 22. This is preferably achieved by connecting the controller 26 to a computer 28 via the computer interface 162, and transferring information from the central processor 154 to the computer 28 for storage. Such historical information may include the time of an incursion event and the zone which the animal penetrated.

Whenever it is not in a powered-down mode, the portable unit 32 transmits a regular handshake signal to the controller 26 to confirm that the portable unit 32 is operative. Failure by the controller 26 to receive a regular handshake signal within a preselected timeout, and without receiving a power-down notice from the portable unit 32, results in a warning to the user that the portable unit 32 may be faulty.

The pet containment apparatus may be used for containing more than one animal at a time, and may be programmed to provide customized levels of correction to a number of animals. The central processor 154 is programmed to determine a level of correction according to the zone the animal enters and the particular portable unit on the animal. For example, the central processor 154 may be programmed to provide high levels of direction to a disobedient animal or one which is at an early training stage, so that an electrical shock correction is applied whenever the animal reaches any zone around the buried wire 22. The central processor may be programmed to command electrical shocks of increasing intensity as the animal 30 approaches the buried wire. The central processor 154 may also be programmed to respond differently to a second animal which, for example, is well trained or unable to withstand severe correction. In the case of the second animal, the central processor 154 may be programmed to command only an audible warning, irrespective of how closely the second animal approaches the buried wire 22. Additionally, the correction strategy for each animal may be updated. A young animal being introduced to the containment system may initially require high levels of correction but, as the animal is trained in the use of the animal containment system 19, the programmed correction levels may be changed so as to reduce the level of correction necessary to keep the animal within the bounds of the containment system. In order for the controller 26 to determine which animal of a number of animals is approaching the buried wire 22, each portable unit 32 is provided with a unique identifying code which is transmitted to the central processor 154 along with any other information which is transmitted to the controller 26. The controller 26 is thus able to establish which animal approaches the buried wire 22.

An input keypad 172 is provided to facilitate programming of the central processor 154 by the user. The input keypad 172 is connected to the central processor via key select lines 174 and key pressed lines 176. A user may employ the input keypad 172 for entering such information as the levels of correction associated with each portable unit 32 for each zone, or the length of time that correction is applied to the animal 30 in a single zone before increasing to a next level of correction, or ceasing correction altogether.

The computer interface 166 permits connection of the pet control apparatus 19 to a computer 28 for remote control and monitoring of the pet control apparatus 19 and for logging activity of the animal 30. For example, user-friendly control software may be provided on the computer 28 to allow the user to remotely program the controller 26, rather than using the input keypad 172. Monitoring software provided on the computer 28 may allow the user to record the activity of the animal 30, including periods of inactivity and incursions to the correction zones. The monitoring software may also allow an automatic alarm signal to be sent via telephone line to a remote location.

The controller 26 is provided with a power supply 178 to provide power to all the controller's components at appropriate voltage levels.

Figure 6:
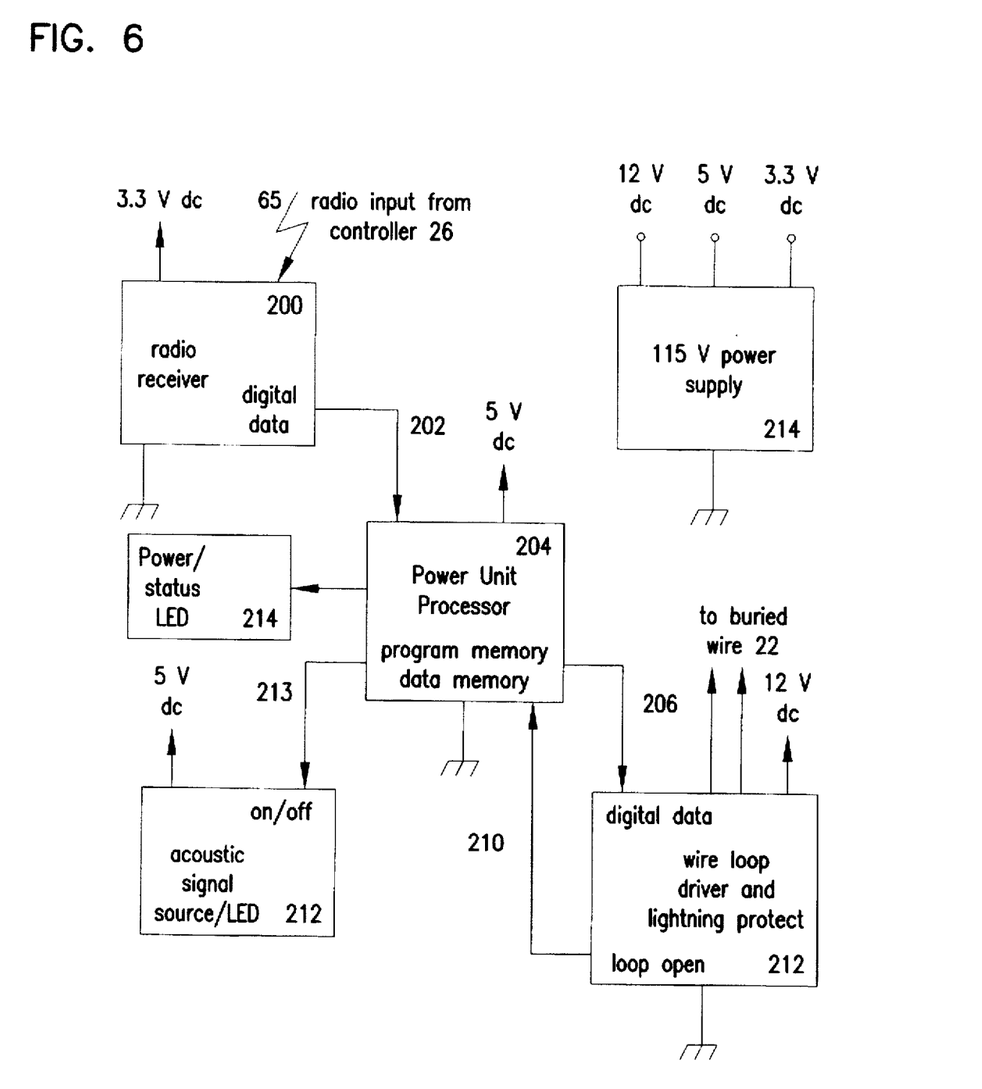
FIG. 6 illustrates a block diagram schematic of the power unit of the electronic confinement apparatus.

FIG. 6 illustrates a block diagram schematic of the power unit 24. A radio receiver 200 receives control signals transmitted from the controller 26. The received control signals are directed on control signal line 202 to the power unit processor 204 where the received control signals are processed. After processing, the power unit processor 204 directs current control signals 206 to the wire loop driver 208 which drives current signals around the buried wire 22. The wire loop driver 208 also includes lightning protection circuitry to reduce the effect of nearby lightning strikes. Another function of the wire loop driver 208 is to check for continuity. If the wire loop driver 208 detects that there is no continuously conducting path around the buried wire 22, then a loop open signal 210 is transmitted to the power unit processor 204. The power unit processor 204 is connected to an acoustic signal source and/or LED 212 which serves as an alarm indicating alarm conditions in the power unit 24. Alarm conditions may include that the buried wire 22 shows open loop, or may indicate that the power unit 24 has received an animal-out-of-bounds signal from the controller 26.

The power unit 24 is provided with a power supply 214 which preferably generates three separate DC voltage levels. The 3.3 Volt DC level may be used for powering the radio receiver 200. The 5 Volt DC level may be used in powering the central processor 204 and the acoustic signal source/LED 212. The wire loop driver 208 is typically powered at 12 Volt DC level. A power status LED display 216 indicates the present power status, for example whether the power unit is functioning normally or to indicate that there is a fault.

Figure 7:
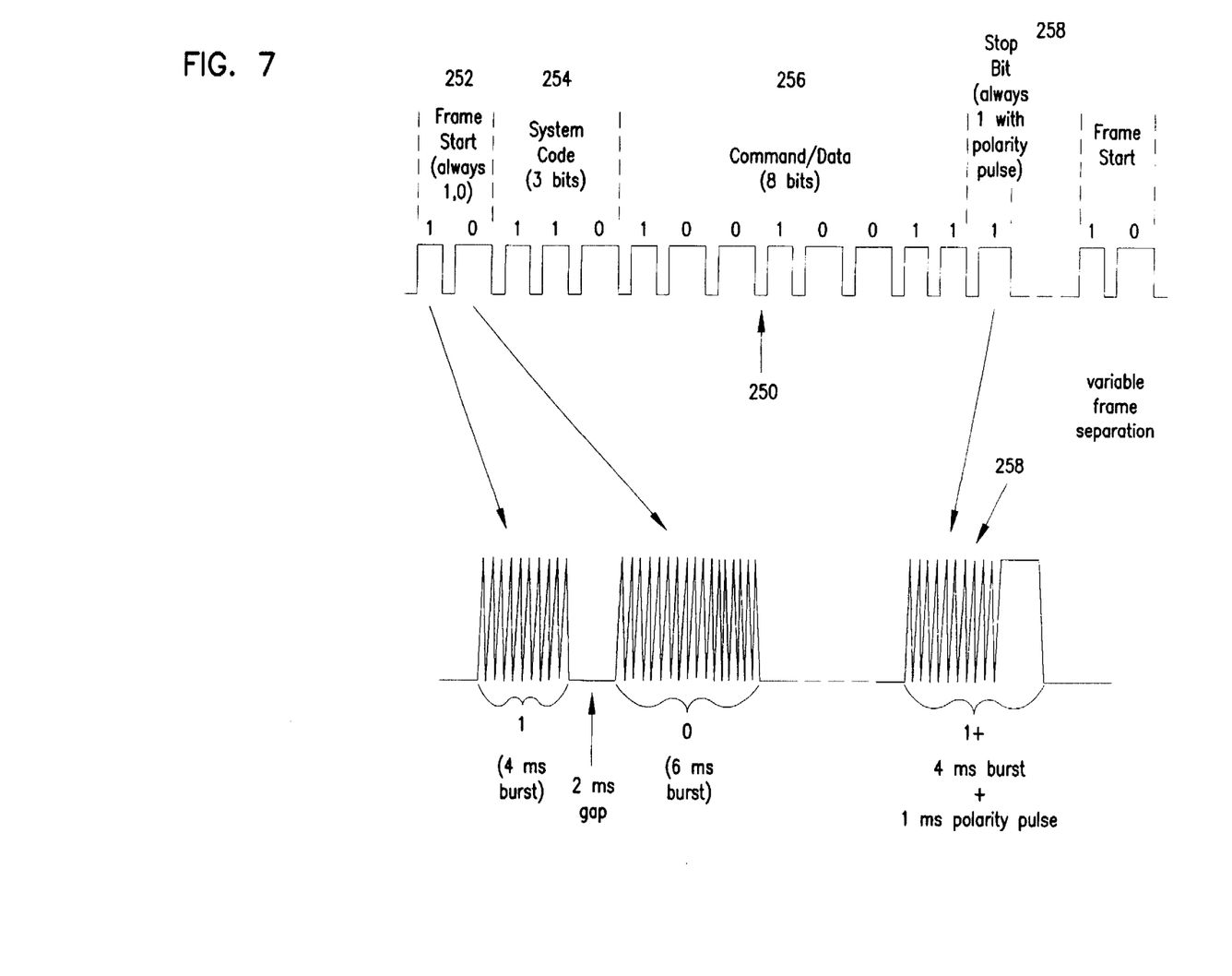
FIG. 7 illustrates waveforms generated on the buried wire by the power supply unit.

The signals transmitted by the power unit 26 and received by the portable unit 32 are discussed with reference to FIGS. 7 and 8A–8D. The power unit 26 transmits a series of current pulses around the buried wire 22 to generate the magnetic field 44 detected by the portable unit 32. The current pulses are also encoded with information, such as data or commands, from the controller 26. The following discussion describes a preferred approach to encoding the current pulses for information transfer. FIG. 7 illustrates the signal transmitted by the power unit 24 along the buried wire 22. The signal includes a frame 250, where the frame is a binary word having four distinct components. The first component is the frame start 252 which includes a "1" and a "0". The second component is the system code, typically comprising three bits, and which indicates a code number related to the controller unit 26. The system code 254 is used, for example, to distinguish between pet containment systems operating in neighboring back yards. Following the system code 254, is the command data component 256, typically comprising 8 bits. The command data component 256 includes a header indicating which portable unit 32 out of a plurality of portable units the following command is directed to. The remainder of the command data component 256 includes the instructions for the particular portable unit 32, such as correction commands. The final component of the frame is stop bit 258 which is a "1" followed by a polarity pulse.

The digits in the binary frame 250 are produced by burst width modulation of 10 kHz bursts. For example, a "1" may typically be represented by a 4 millisecond burst at 10 kHz, and "0" may typically be represented by a 6 millisecond burst at 10 kHz. The standard separation between bits is 2 milliseconds. The length of the frame 250 can vary, depending on the number of zeros present in the frame 250. The separation between adjacent frames may be varied so that the time lapse between frame starts is constant between all frames. The stop bit 258 transmitted by the power unit 24 includes a 4 millisecond burst followed by a 1 millisecond polarity pulse. The polarity pulse is a unipolar pulse without 10 kHz modulation. It is understood that the frequency of the bursts may be at frequencies other than 10 kHz.

Figure 8A:
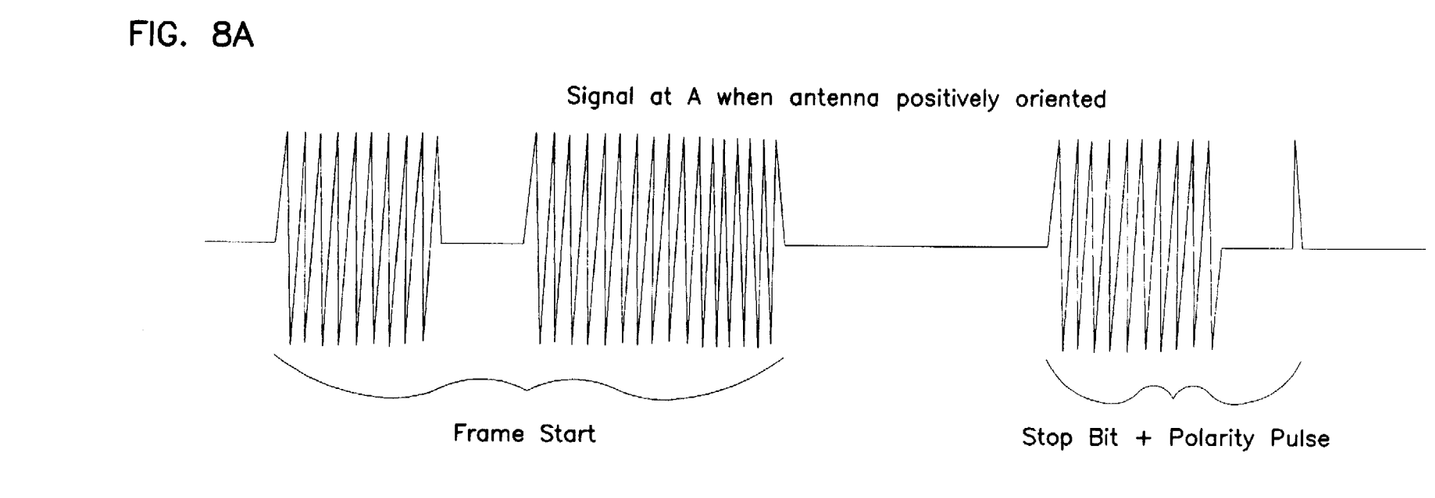
FIGS. 8A–8D illustrate waveforms detected and analyzed by the portable unit.
Figure 8B:
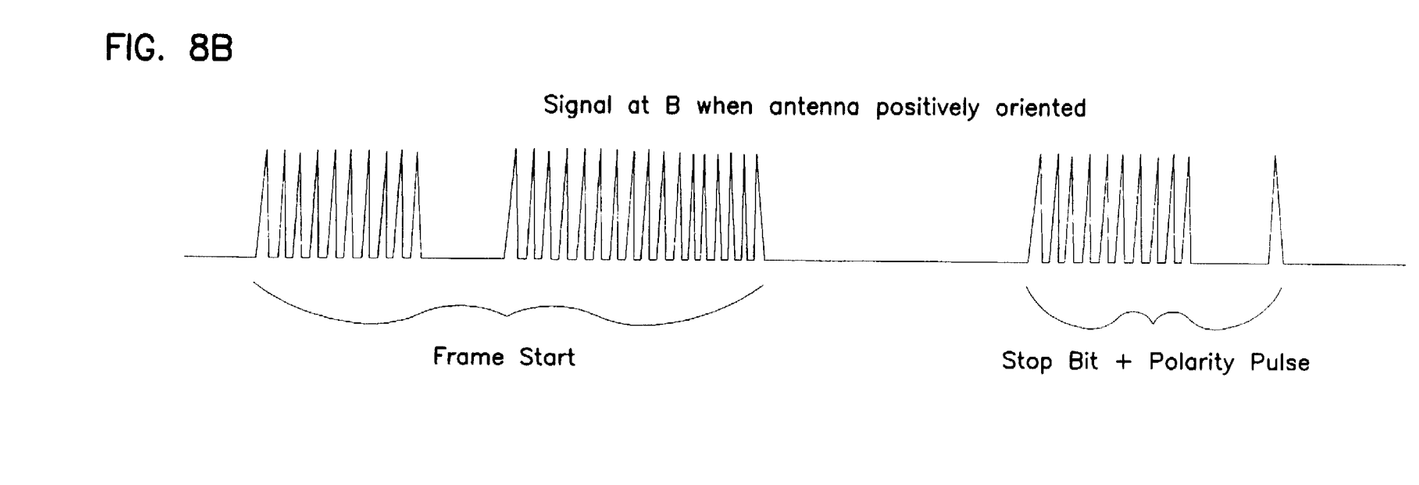
Figure 8C:
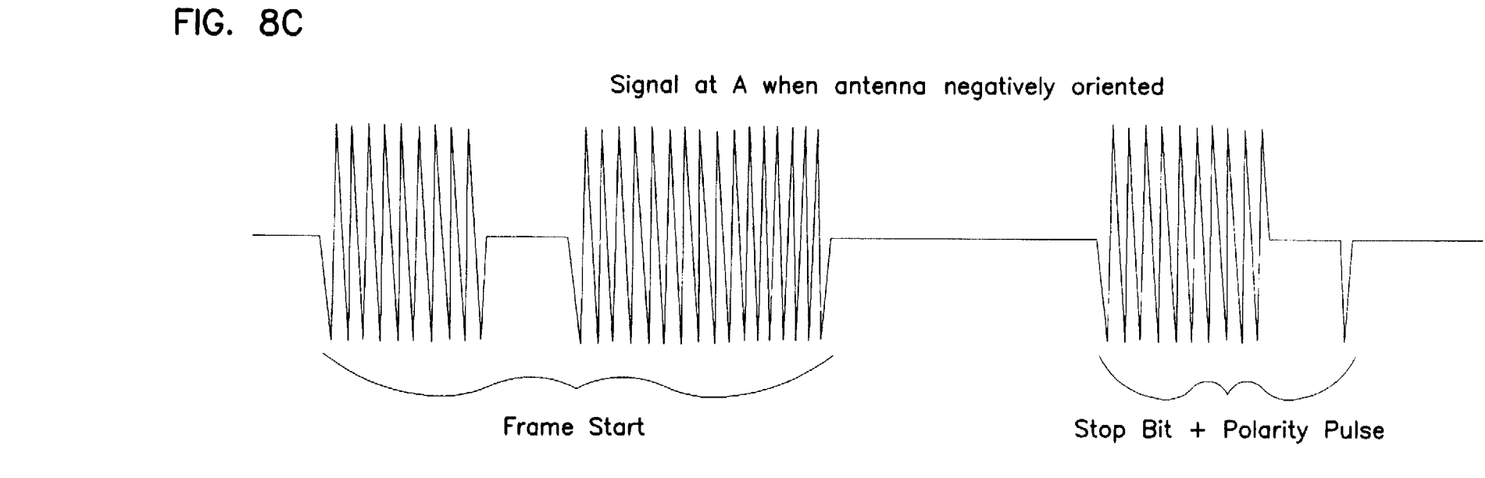
Figure 8D:
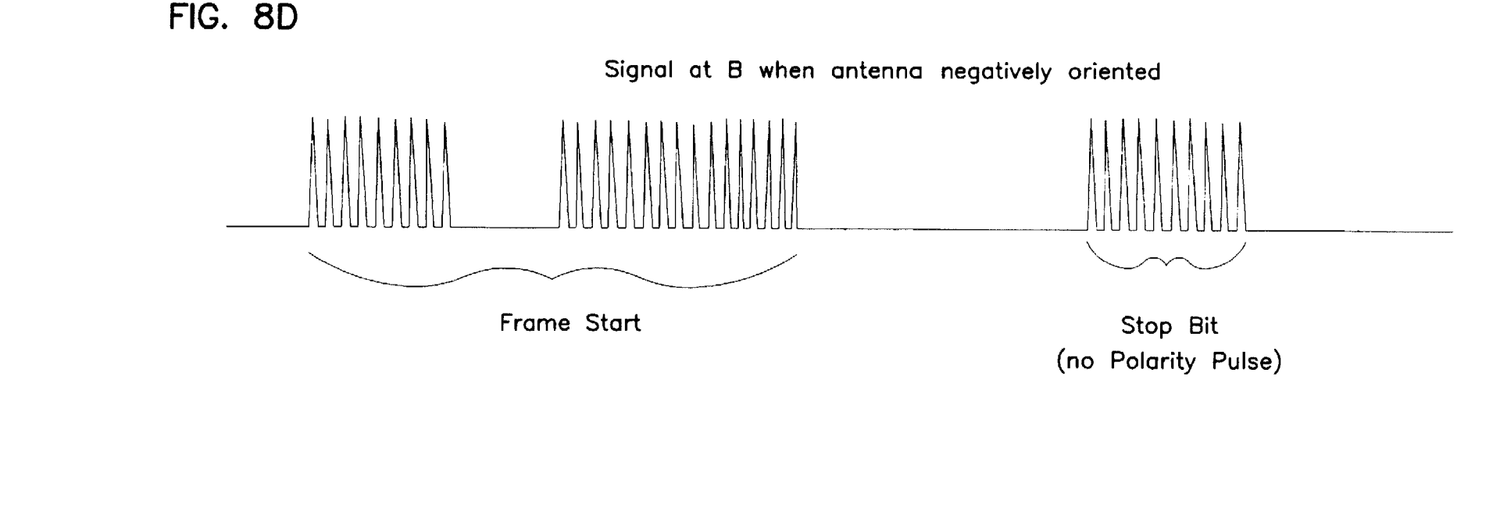

FIG. 8A illustrates a portion of the signal received by one of the antennas 100 and 102, as would be detected at position A in FIG. 4. It is assumed for FIG. 8A that the antenna has a positive orientation, where a positive orientation is defined as the antenna having a component aligned parallel to the vertical magnetic field component. In a negative orientation, the antenna has a component aligned antiparallel to the vertical magnetic field component. For the case shown, the polarity pulse is detected as being positive. FIG. 8B shows the same signal once it has been transmitted through the comparator 108, at point B. The comparator 108 produces a logic high whenever the incoming signal is above the reference signal voltage 110. FIG. 8C illustrates signal received at point A when the receiving antenna is negatively oriented. In this case, the polarity pulse is negative. FIG. 8D illustrates the signal produced by a comparator at point B resulting from the detected signal shown in FIG. 8C. Since the polarity pulse in this case is negative, the polarity pulse does not produce a logic high at the end of the frame. By detecting the presence or absence of the polarity pulse, the portable unit processor 58 can determine the relative orientation of the receiving antenna to the magnetic field 44 produced by the buried wire 22. The low pass filter smoothes the 10 kHz bursts to produce binary signals at C as input to the portable unit processor 58. The input to the portable unit processor 58 may also include a polarity pulse.

The portable unit processor 58 may determine the vertical direction of the detected magnetic field 44 from relative orientation of the antennas 100 and 102 and the magnetic field 44, determined according to the above paragraph, and the input from the tilt switch array 68. The tilt switch array 68 indicates the physical orientation of the receiving antenna. If the tilt switch array 68 indicates that the receiving antenna is oriented upwards, then the detection of the polarity pulse indicates that the animal is within the selected space 20. On the other hand, if the receiving antenna is shown by the tilt switch array 68 to be oriented upwards, but no polarity pulse is detected, then the animal 30 is outside the selected space 20 in a position where the magnetic field 44 generated by the buried wire 22 has a downwards component. Conversely, when the tilt switch array indicates that the receiving antenna is oriented downwards, and if a polarity pulse is not detected, then the animal is determined to be within the selected space 20. Lastly, if the tilt switch array 68 determines that the receiving antenna is oriented downwards and a polarity pulse is detected, then the animal 30 is determined to be outside the selected space 20. A truth table is given below which summarizes the combinations of receive antenna signal and tilt switch array signal to determine the position of the animal relative to the buried wire 22.

TABLE 1

Animal Position Truth Table

|  |  | TILT SWITCH ARRAY RESULTS: | |
| --- | --- | --- | --- |
|  |  | UP | DOWN |
| Polarity Pulse | Yes | Inside | Outside |
| Detected? | No | Outside | Inside |

Once the central processor has determined whether the animal 30 is inside or outside the selected space 20, this information, along with information regarding the current zone number, is transmitted to the controller 26, thus enabling the controller 26 to determine the appropriate correction for the animal 30 depending on its location.

After the animal 30 re-enters the perimeter of the selected space 20, correction is not applied until the controller detects that the animal 30 has cleared the outer zone 3 around the buried wire 22 and has received a regular handshake signal. This avoids correcting the animal immediately after it has crossed the buried wire and the vertical component of the magnetic field 44 reversed.

The antenna 100 or 102 used to provide information on the relative orientation of the antenna and the magnetic field is preferably oriented within 45° of vertical to produce a valid signal. The orientation of the antenna 100 or 102 may be indicated by the tilt switch array 68. For example, the tilt switch array 68 may be adapted to produce no up or down signals unless the relevant tilt switches are within 45° of being vertical. Signals received from an antenna 100 or 102 may be discounted when the tilt switch array 68 indicates that that antenna is not within 45° of vertical.

The following paragraph describes some alternative methods of accomplishing the same objects. The portable unit 32 may be adapted to operate autonomously, without interacting with a controller 26. In such a case, the power unit 24 would be adapted to produce a magnetic field 22 from which the portable unit is able to determine the vertical component of the magnetic field 22. The portable unit 32 would then be able to determine which side of the buried wire 22 the animal was on, and correct the animal 30 accordingly.

The comparator 108 may be provided with a different number of reference signal voltage levels, for example 8, thus permitting detection of the animal in 8 different zones, rather than 4. Other methods may be used to determine the orientation of the antenna relative to the magnetic field 44 generated by the buried wire 22. For example, rather than detecting the presence of a polarity pulse at the end of the frame, the portable unit 32 could alternatively detect the direction of the rising edge of the frame, indicating positive or negative relative orientation between the receiving antenna 100 or 102 and the magnetic field 44. Alternatively, the power unit 24 could transmit an asymmetrical signal on the buried wire 22, allowing the portable unit 32 to detect normal or inverted input and thus determine relative orientation between the receiving antenna 100 or 102 and the magnetic field 44.

The information transmitted from the controller 26 to the portable unit 32 could be encoded using a protocol different from the one described with reference to FIGS. 7 and 8A–8D. For example, a pulse position modulation technique could be used, rather than pulse width modulation. The frame could be configured to include more bits for carrying more information. Also, bi-directional radio communications could take place between the controller 26 and the portable unit 32, in which case the power unit 26 could transmit unencoded current pulses around the buried wire 22.

The concept of making a determination of which side of a perimeter the animal is on, and then correcting the animal accordingly may be extended to other types of animal control systems, including those which rely on radio, ultrasonic or infrared detection of the animal's position.

In summary an electronic system for containing an animal within a selected area has been described. If the animal escapes out of the selected area, the system allows the animal to re-enter the area without correction being applied. The system also provides important information to the user, such as battery level condition, provides an alarm when the animal crosses out of the selected area, and allows the user to maintain log of animal activity and behavior.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of restricting movement of an animal relative to a selected area surrounded by a conducting perimeter, comprising the steps of:

sensing whether the animal approaches the conducting perimeter from inside the selected area or from outside the selected area; and selectively correcting the animal in response to results of the sensing step.

2. The method of claim 1, wherein a portable unit is provided on the animal, the sensing step uses a sensor disposed within the portable unit and the correcting step includes the step of using a correction unit disposed within the portable unit.

3. The method of claim 2, comprising the further step of transmitting battery status information from the portable unit to a controller.

4. The method of claim 1, wherein the sensing step comprises detecting a direction of a magnetic field produced by the conducting perimeter.

5. The method of claim 4, wherein the detecting step comprises determining a polarity of a voltage induced by the conducting perimeter.

6. The method of claim 1, wherein the sensing step comprises the step of determining which animal of a plurality of animals is approaching the conducting perimeter and the correcting step comprises the step of correcting the animal determined in the determining step.

7. The method of claim 1, comprising the further step of estimating a separation distance between the animal and the conducting perimeter, wherein the correcting step is carried out in response to the estimated separation distance.

8. The method of claim 1, wherein the sensing step further comprises determining whether the animal moves away from the conducting perimeter in response to correction applied in the correcting step, and the correcting step further comprises adjusting a correction level in response to the determining step.

9. The method of claim 1, comprising the further step of surrounding the selected area with a wire to form the conducting perimeter.

10. A method of restricting movement of an animal relative to a selected area surrounded by a conducting perimeter, comprising the steps of:

sensing the animal approaching the conducting perimeter and producing sensing signals;

transmitting the sensing signals to a central controller; and correcting the animal in response to correction commands received from the central controller.

11. The method of claim 10, comprising the further step of selecting correction commands in response to which portable unit of a plurality of portable units transmitted the sensing signals.

12. The method of claim 10, wherein a portable unit is provided on the animal, the sensing step is carried out by a sensor disposed within the portable unit and the correcting step is carried out by a correction unit disposed within the portable unit.

13. The method of claim 12, comprising the further step of transmitting battery status information from the portable unit to a controller.

14. The method of claim 10, comprising the further step of estimating a separation between the animal and the conducting perimeter, and wherein the correcting step is correction commands are selected in response to the separation of the estimating step.

15. The method of claim 10, wherein the sensing step further comprises determining whether the animal moves away from the conducting perimeter in response to correction applied in the correcting step, and the correcting step further comprises adjusting a correction level in response to the determining step.

16. The method of claim 10, comprising the further step of surrounding the selected area with a wire to form the conducting perimeter.

17. Apparatus restricting movement of an animal relative to a first selected area surrounded by a conducting perimeter, comprising:

a portable unit, affixable to the animal, including a sensor to sense whether the animal approaches the conducting perimeter from inside the first selected area or outside the first selected area; and a correction unit coupled to the portable unit to provide correction to the animal in response to a sensor output.

18. The apparatus of claim 17, further comprising a control unit coupled to a radio receiver, and the portable unit further comprising a radio transmitter to transmit the sensor output to the radio receiver, wherein the control unit transmits a control signal to the correction unit to control the correction provided to the animal.

19. The apparatus of claim 18, wherein the sensor is used to estimate proximity of the conducting perimeter, and the control unit comprises a memory to hold data corresponding to different levels of correction associated with the estimated proximity.

20. The apparatus of claim 18, wherein the control unit comprises a memory to hold data corresponding to correction levels associated with a plurality portable units and the control unit transmits the control signal in response to which portable unit of the plurality of portable units transmits the sensor output.

21. The apparatus of claim 18, wherein the portable unit comprises a battery connected to a regulator circuit having a low battery voltage output signal, and the transmitter transmits battery status information in response to the low battery voltage output signal.

22. The apparatus of claim 18, wherein the control unit comprises a computer interface that couples the control unit to a computer.

23. The apparatus of claim 18, wherein the control unit comprises an alarm activatable in response to the animal crossing the conducting perimeter.

24. The apparatus of claim 18, wherein the transmitter is configured to transmit handshake signals to the controller at regular intervals.

25. The apparatus of claim 18, further comprising a first wire surrounding the selected area as the conducting perimeter and a first power unit connected to the first wire to drive current pulses around the wire, the first power unit receiving control information from the control unit.

26. The apparatus of claim 25, further comprising a second wire surrounding a second selected area and a second power unit connected to the second wire to drive current pulses around the second wire, the second power unit receiving control information from the control unit.

27. The apparatus of claim 17, wherein the sensor comprises two orthogonal antennas and a tilt switch array to sense direction of a magnetic field produced by the conducting perimeter.

28. The apparatus of claim 27, wherein the sensor further comprises a circuit adapted to determine polarity of a voltage induced within the portable unit by the conductive perimeter.

29. The apparatus of claim 28, wherein the circuit comprises a gain module to amplify an antenna signal and a comparator to compare an output from the gain module with a programmable reference signal.

30. The apparatus of claim 17, wherein the sensor comprises a detector to detect movement of the animal.

31. The apparatus of claim 17, wherein the portable unit is configured so as to enter a standby mode during periods of animal inactivity.

32. The apparatus of claim 17, wherein the correction unit comprises an electrical shock generator and an acoustic signal generator.

33. Apparatus restricting movement of an animal relative to a first selected area surrounded by a conducting perimeter, comprising:

a portable unit, affixable to the animal, that detects proximity of the conducting perimeter, transmits conducting perimeter proximity information and provides correction to the animal in response to control signals; and a central controller that transmits the control signals to the portable unit in response to the conducting perimeter proximity information.

34. The apparatus of claim 33, further comprising a power unit connected to the conducting perimeter and encoding signals on the conducting perimeter in response to instructions from the central controller, the signals encoded by the power unit receivable by the portable unit as control signals.

35. The apparatus of claim 33, wherein the portable unit comprises a radio transmitter to transmit the conducting perimeter proximity information and a magnetic field detector to detect a magnetic field generated by the conducting perimeter.

36. The apparatus of claim 35, wherein the radio transmitter transmits handshake signals to the central controller at regular intervals.

37. The apparatus of claim 33, further comprising a power unit to supply electrical signals to the conducting perimeter, and wherein the central controller comprises a radio receiver to receive the conducting perimeter proximity information from the portable unit and a radio transmitter to transmit power unit control signals to the power unit.

38. The apparatus of claim 33, wherein the control unit comprises a memory to hold data corresponding to correction levels associated with different portable units and the control unit is configured to transmit the control signals in response to which portable unit of a plurality of portable units transmits the sensor signal.

39. The apparatus of claim 33, wherein the portable unit comprises a battery connected to a regulator circuit having a low battery voltage output signal, and the portable unit transmits battery status information to the central controller in response to the low battery voltage output signal.

40. The apparatus of claim 33, wherein the sensor comprises two orthogonal antennas and a tilt switch array configured to sense direction of a magnetic field produced by the conducting perimeter.

41. The apparatus of claim 33, wherein the central controller comprises an alarm activatable in response to the animal crossing the conductive perimeter.

42. The apparatus of claim 33, wherein the sensor comprises a detector to detect movement of the animal.

43. The apparatus of claim 33, wherein the portable unit is configured so as to enter a standby mode during periods of animal inactivity.

44. The apparatus of claim 33, wherein the portable unit comprises an electrical shock generator and an acoustic signal generator.

45. The apparatus of claim 33, further comprising a first wire surrounding the first selected area as the conducting perimeter and a first power unit connected to the first wire to drive current pulses around the wire, the first power unit receiving control information from the central controller.

46. The apparatus of claim 45, further comprising a second wire surrounding a second selected area and a second power unit connected to the second wire to drive current pulses around the second wire, the second power unit receiving control information from the central controller.

47. A system for confining an animal within a selected area surrounded by a conducting perimeter, comprising:

a collar unit for wearing by the animal, the collar unit comprising a collar, a sensor to sense a magnetic field produced by the conducting perimeter, a transmitter to transmit sensor information and a correction unit to provide correction to the animal; and a controller configured to control the magnetic field of the conducting perimeter, the controller comprising a receiver to receive the sensor information transmitted by the portable unit, a processor to determine a degree of correction in response to the sensor information and a transmitter to transmit control signals to the portable unit so as to control the correction unit.

48. The system of claim 47, further comprising a power unit to provide power to the conducting perimeter in response to perimeter control signals received from the controller.

49. The system of claim 47, wherein the controller further comprises a memory to store correction information for a plurality of collar units and the controller is configured to transmit control signals in response to which collar unit of the plurality of collar units transmits the sensor information.

* * * * *